June 17, 1924.
E. C. CLEVELAND
AUTOMOBILE BRAKE
Filed Dec. 22, 1922
1,498,352
3 Sheets-Sheet 1
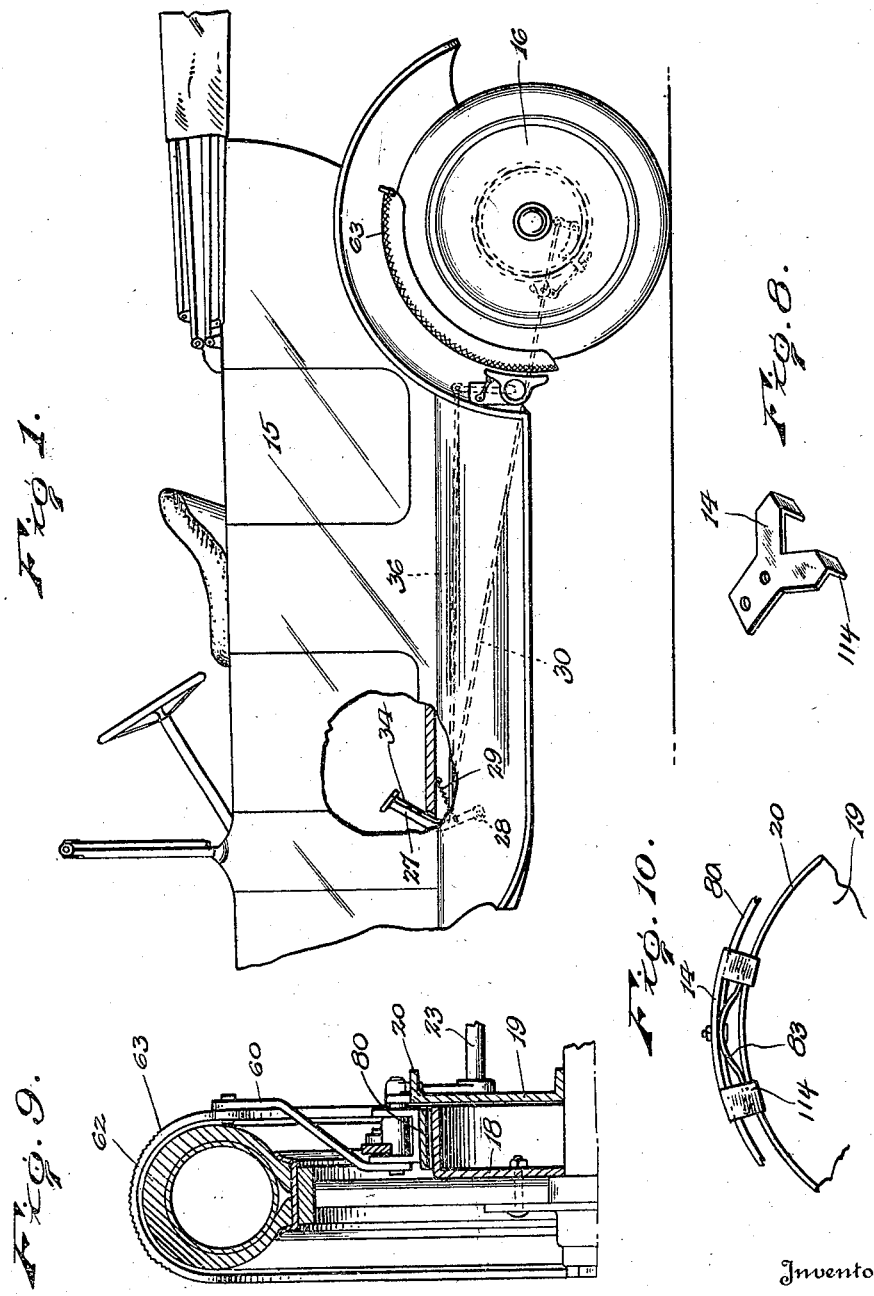
Inventor
E. C. Cleveland.
By Lacey & Lacey, Attorneys

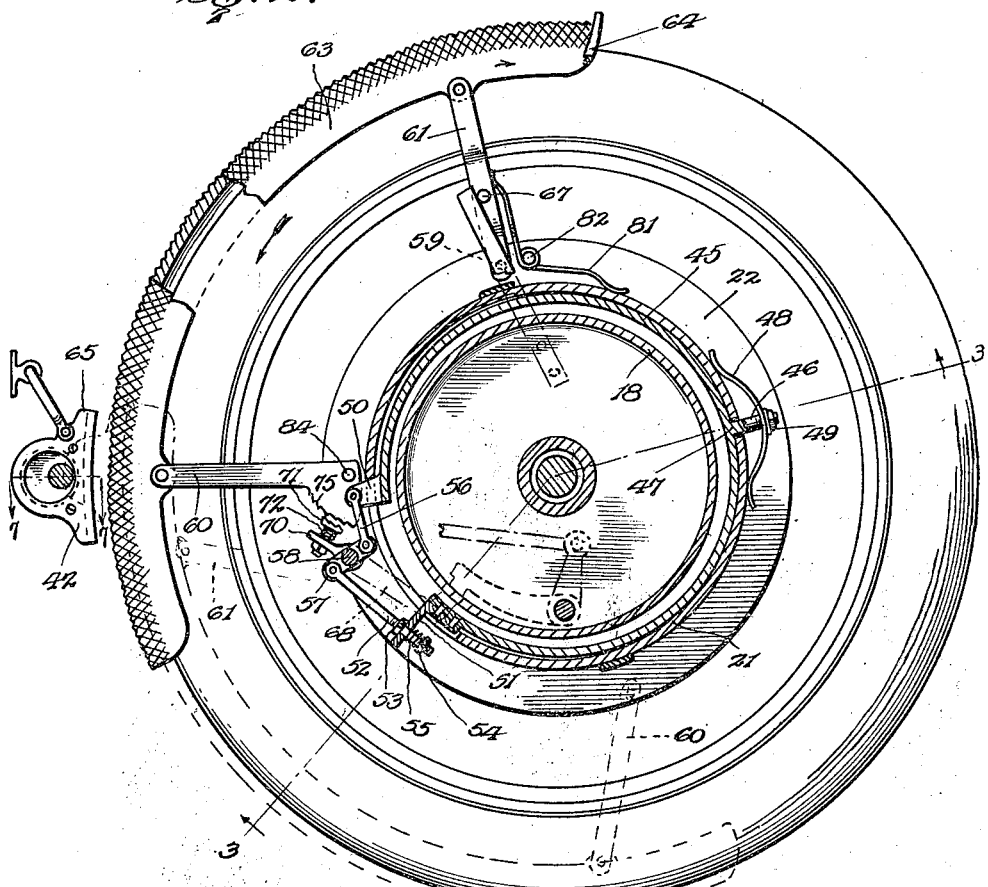
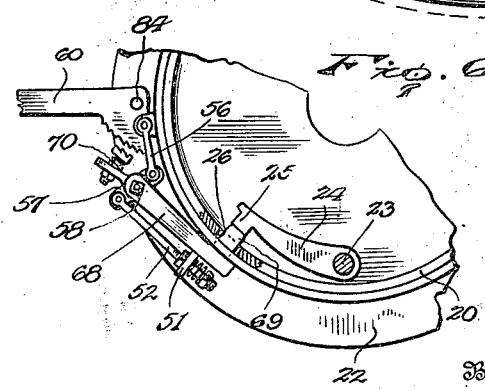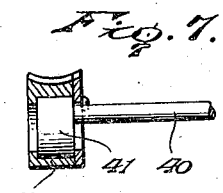

June 17, 1924.
E. C. CLEVELAND
AUTOMOBILE BRAKE
Filed Dec. 22, 1922
1,498,352
3 Sheets-Sheet 3
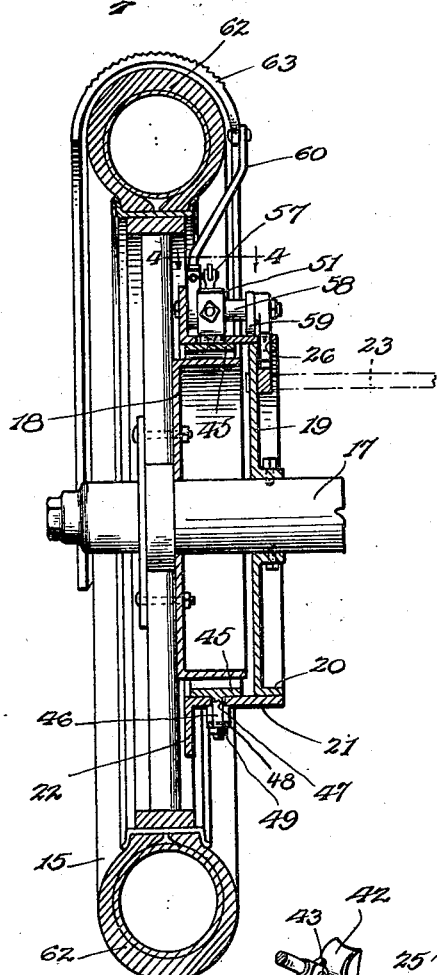

Patented June 17, 1924.

1,498,352

UNITED STATES PATENT OFFICE.

ERNEST C. CLEVELAND, OF PARIS, KENTUCKY.

AUTOMOBILE BRAKE.

Application filed December 22, 1922. Serial No. 608,469.

*To all whom it may concern:*

Be it known that I, ERNEST C. CLEVELAND, a citizen of the United States, residing at Paris, in the county of Bourbon and State of Kentucky, have invented certain new and useful Improvements in Automobile Brakes, of which the following is a specification.

The present invention relates to a device, the principal function of which is to act as a wheel brake for vehicles, and more particularly for vehicles of the self-propelling class such as automobiles and motor trucks.

One object of the invention is to construct the brake in the form of an arcuate shoe extending substantially around the wheel a quarter more or less of its circumference and partly embracing the sides of the wheel tire.

A further object of this invention is to mount the brake in such a position with relation to a vehicle wheel that the brake shoe, under certain conditions, may turn with the wheel and assist in raising it out of a rut in the roadway in the manner of the operation of anti-skid chains. Its advantages over such chains, however, resides in the fact that the tire will not be worn or dented thereby on account of its extensive inner surface engaging fully one quarter of the circumference as well as a considerable portion of the sides of the tire and may be applied instantly.

In vehicles provided with ordinary band brakes acting on a drum on the wheel hub, the wheel tires experience a considerable wear when the brakes are applied which tends to materially shorten the life of the tires.

A still further object of the present invention is to preserve the tires as much as possible, which is accomplished by interposing the brake shoes between the wheels and the ground when the brakes are applied so that all the wear will take place along the outer face of the brake shoes instead of on the tire itself.

In the accompanying drawings forming the subject-matter of the present invention—

Figure 1 is a fragmentary side elevation of an automobile provided with the preferred construction of the brake;

Figure 2 is a side elevation and partial section of a vehicle wheel showing the brake details in position thereon;

Figure 3 is a section along line 3—3 of Figure 2 looking upwards as indicated by the arrows;

Figure 4 is a section along line 4—4 of Figure 3;

Figure 5 is a perspective view of the operating levers for the brake;

Figure 6 is a fragmentary side elevation similar to Figure 2 of some of the details;

Figure 7 is a sectional view of the brake block;

Figure 8 is a perspective view of a clip used in connection with the brake;

Figure 9 is a sectional view similar to Figure 3 of a slightly modified form of brake, and—

Figure 10 is a detail of a portion of this modified construction.

In the drawings, the reference numeral 15 represents an automobile and the numeral 16 a hind wheel thereof carried on the rear axle 17 in the usual manner. The wheel is here shown of the pneumatic type, but the invention is equally applicable to wheels having solid rubber or metallic tires. The wheel carries a brake drum 18 rigidly secured thereon so as to partake in its rotation. On the wheel axle 17 is rigidly secured a disc 19 provided with an annular flange 20, as best seen in Figure 3. Upon this disc is revolubly mounted a hollow cylinder 21 having an outwardly projecting flange 22 situated in a vertical plane of the wheel. The hollow cylinder 21 is held in position upon the flange 20 of the disc 19 by means of a number of clips 14 engaging with their fingers 114 over the inner edge of the flange, as best seen in Fig. 4. On the disc 19 an operating shaft 23 is mounted to oscillate and on this shaft is secured a lifting dog 24 having a nose 25 projecting radially therefrom and adapted to engage in a corresponding aperture 26 provided in the flange 20. The nose 25 is normally retracted in an inward direction from said aperture 26 by means of a foot brake 27 fulcrumed in the ordinary manner, as at 28, on the automobile and held in released position by means of a spring 29. This foot brake connects with the operating shaft 23 through the intermediary of a connecting rod 30 journaled, as at 31, on the foot brake and as at 32 on the short arm 33 secured on the operating shaft 23.

A second foot brake 34 is similarly fulcrumed on the automobile and situated adjacent to the first foot brake 27, a spring 79 holding it in released position. This second foot brake has a side projection 35 adapted to engage with the rear face of the first foot brake 27, as clearly shown in Figure 5. It will thus be seen that the foot brake 27 can be operated independently of the second foot brake 34, while the latter on being depressed will also depress the first foot brake 27. A link 36, journaled as at 37, connects the second foot brake 34 with an arm 38 to which it is journaled as at 39. This arm 38 is rigidly secured on an operating shaft 40 carried in suitable brackets on the automobile and provided with an eccentric or bell crank 41 at each end thereof. Each of the eccentrics or bell cranks engages with a concave brake block 42 suspended on a journal 43 so as to receive radial movement as regards the axis of the wheel upon the turning of the shaft 40 actuated by the second foot brake 34.

A brake band 45 extends substantially around the entire circumference of the drum 18, with the exception of a short length at the free ends thereof. Approximately midway between the two ends, the brake band 45 is carried on a stud 46 engaging in an aperture 47 provided in the hollow cylinder 21. This stud projects a short distance beyond the outer periphery of the hollow cylinder 21 and is drawn outwardly through the action of a spring 48 secured thereon by means of a nut 49, the curved ends of the spring 48 resting at the outer periphery of the hollow cylinder 21, as best seen in Figs. 2 and 3. In this manner the brake band 45 is held tightly against the inner circumference of the hollow cylinder 21 and the brake band being resilient is curved in such a manner that the ends and the entire inner part thereof normally stand free from the brake drum 18, which is of sufficiently smaller diameter than the hollow cylinder to provide a space between them. The free ends of the brake band 45 each carry a lug 50 and 51, respectively, of which the latter engages the end of a connecting rod 52 which is threaded on this end and provided with nuts 53 and 54. Between the outer nut 54 and the lug 51 is inserted a coiled compression spring 55, as best seen in Figure 2. The lug 50 at the other end of the brake band 45 has a short link 56 journaled thereon and connecting the same with a two-armed lever 57 carried on a spindle 58 which is mounted in bearings 59 on the hollow cylinder 21, as best seen in Figure 3. The opposite end of the two-armed lever 57 is hinged to the connecting rod 52, as seen in Figs. 2 and 6.

Upon the annular flange 22 of the hollow cylinder 21 are journaled, as at 84 and 59, two oscillating arms 60 and 61, respectively, which extend in radial direction to the outer periphery of the tire 62 of the vehicle wheel and are held normally in this position by a spring 81 coiled around a pin 82 secured in the flange 22. Upon these arms is hinged a brake shoe 63 which is of arcuate shape to coincide with the curvature of the wheel tire. It is roughened on its outer side and has a cross section permitting it to partly embrace the sides thereof. The length of the brake shoe 63 is equal to an angular extent of the wheel tire of about one hundred degrees, or as far as necessary, as seen in Figs. 1 and 2. The arms 60 and 61 are of such a length that when in normal position the brake shoe 63 is spaced from the wheel tire, but when swung in a counter-clockwise direction, as seen in full lines in Figure 2, they will permit the brake shoe 63 to descend against the tire and engage therewith. At the top end of the shoe is provided an outwardly projecting ear 64 which is adapted to engage with the top 65 of the brake block 42, under certain conditions of its operation. Rigidly secured on the disc 19 is an abutment member 66 which is adapted to normally engage with a finger 67 on the oscillating arm 61, as seen in Figs. 2 and 4.

Referring particularly to Fig. 6 of the drawings, a rocking lever 68 is shown secured on the spindle 58 and provided with a toe 69 normally engaging in the aperture 26 provided in the annular flange 20 of the disc 19. This engagement occurs simultaneously with that of the finger 67 with the abutment member 66. In this manner the brake band 45 is locked to the disc 19 when it is in its open or disengaged position, as seen in Fig. 2, while at the same time the brake shoe 63 is lifted off the wheel tire 62 by means of a strong spring. The spindle 58 also carries any suitable ratchet device, here shown as a lug 70 on which is yieldably mounted a pawl 71 by means of a spring 72. This pawl is adapted to engage with a ratchet 75 furnished on the arm 60 in order to hold the brake shoe 63 in position close to the wheel tire 62 when in operating position.

The operation of the device is as follows: When utilizing the brake in the ordinary manner to stop the vehicle, the operator will push both foot brakes 27 and 34 in a forward direction by placing his foot on both of them or only on the second foot brake 34, when the first foot brake 27 is simultaneously operated. Turning of the operating shaft 23 will then cause the dog 24 to swing outwardly so that its nose 25 will enter the aperture 26 in the flange 20 and in this manner push the toe 69 of the lever 68 outwardly. The height of the nose 25 is such that the toe 69 will be lifted out entirely from the aperture so that it will be able to slide along the outer periphery of the flange 20 without encountering any obstructions. The swinging of the lever 68 will then draw the lugs 50 and 51 together through the intermediary of the links 52 and 56, in this manner applying the pressure of the brake band 45 against the brake drum 18. The hollow cylinder 21 will now be free to rotate with the wheel a short distance and the finger 67 will slide under the abutment member 66 and compel the arms 60 and 61 to fold down until the brake shoe 63 contacts with the outer periphery of the tire 62 and the latter takes the position shown in dotted lines in Fig. 2 of the drawings. At this moment the ear 64 of the brake shoe will be intercepted by the upper edge 65 of the brake block 42 which has swung inwardly in radial direction of the wheel simultaneously with the swinging of the dog 24, as already described, taking the position shown in dotted lines in Figure 2. The brake shoe can now no longer rotate with the wheel and will obtain a firm hold thereon to stop the vehicle as the shoe is being inserted between the ground and the wheel tire. In this manner all wear of the tire in stopping the vehicle is eliminated Supposing that the vehicle wheel has landed in a rut, then the first foot brake 27 alone is depressed so as to operate the dog 24. The brake block 42 then remains in the position shown in full lines in Figure 2 so that the brake shoe 63 can freely pass between the outer periphery of the tire 62 and the face of the brake block 42 and be permitted to follow the vehicle wheel around. In this manner the shoe will act similarly to skid chains usually carried on the wheels during slippery conditions of the roads and engage with the ground to gradually lift the wheel out of the rut. As, however, the wheel tire 62 now engages with the inner surface of the brake shoe, it will not be exposed to any wear or injury from the rough ground. The friction against the ground will be taken up by the brake shoe 63, which, being made of metal with roughened surface, will stand a great deal more wear than a soft rubber tire.

Directly the foot brakes 27 and 34 have been released the parts will return to normal position by means of springs 29 and 79, that is to say, the brake block 42, being drawn away from the shoe 63, will release the ear 64 on the latter and the dog 24, disengaging from the aperture 26, will permit the toe 69 on the lever 68 to enter this aperture as soon as the brake shoe 63 has traveled around with the wheel from its dotted line position to its full line position, as seen in Figure 2 of the drawings. As soon as the toe 69 of the lever 68 has dropped into the aperture 26 it will be evident that the pawl 72 will release its hold on the ratchet 75 and the arms 60 and 61 will swing out to upright position and the shoe 63 will release the wheel tire.

A slightly modified form of the invention is illustrated in Figs. 9 and 10 where, instead of the hollow cylinder 21 carrying the brake band 45, a brake band 80 itself takes the place of the hollow cylinder 21, the construction in other respects being the same as has already been described.

As, however, the brake band 80 is not supported by the hollow cylinder 21, springs 83 are provided between the flange 20 and the brake band 80 to support the weight of the band. These springs are carried with their free ends upon the flange 20, as seen in Figure 10, and bolted to the clips 14, which in turn are bolted or riveted to the brake band 80, the bent fingers 114 of the clips 14 engaging the inner edge of the flange 20 as already described in order to prevent axial displacement of the brake band.

Having thus described the invention, what is claimed as new is:

1. In a wheel brake, the combination with a stationary member, of a brake band revolubly associated with said stationary member, elements normally locking said brake band to said stationary member, a brake shoe connected with said brake band and adapted to receive oscillating movement as regards the same, and means for disengaging said elements from said stationary member.

2. In a wheel brake, the combination with a stationary member, of a brake band revolubly associated with said stationary member, elements normally locking said brake band to said stationary member, a brake shoe connected with said brake band and adapted to receive oscillating movement as regards the same, and means for disengaging said elements from said stationary member, said elements including a rocking lever normally engaging in an aperture provided in said stationary member.

3. In a wheel brake, the combination with a stationary member, of a brake band revolubly associated with said stationary member, elements normally locking said brake band to said stationary member, a brake shoe connected with said brake band and adapted to receive oscillating movement as regards the same, means for disengaging said elements from said stationary member, said elements including a rocking lever normally engaging in an aperture provided in said stationary member, and said means including a member normally contacting with said rocking lever and adapted to be manually operated.

4. In a wheel brake, the combination with a revoluble member and a stationary annular member, of a brake band, a casing revolubly mounted on said stationary member, said brake band having yieldable connection with said casing, links on said casing, a brake shoe hinged on said links, elements normally locking said casing to said stationary member, and means for disengaging said elements from said stationary member.

5. In a wheel brake, the combination with a revoluble member and a stationary annular member, of a brake band, a casing revolubly mounted on said stationary member, said brake band having yieldable connection with said casing, links on said casing, a brake shoe hinged on said links, elements normally locking said casing to said stationary member, and means for disengaging said elements from said stationary member, said elements including a rocking lever normally engaging in an aperture provided in said stationary member.

6. In a wheel brake, the combination with a revoluble member and a stationary annular member, of a brake band, a casing revolubly mounted on said stationary member, said brake band having yieldable connection with said casing, links on said casing, a brake shoe hinged on said links, elements normally locking said casing to said stationary member, means for disengaging said elements from said stationary member, said elements including a rocking lever normally engaging in an aperture provided in said stationary member, and arms connecting said rocking lever with the ends of the brake band.

7. In a wheel brake, the combination with a revoluble member and a stationary annular member, of a brake band, a casing revolubly mounted on said stationary member, said brake band having yieldable connection with said casing, links on said casing, a brake shoe hinged on said links, elements normally locking said casing to said stationary member, means for disengaging said elements from said stationary member, said elements including a rocking lever normally engaging in an aperture provided in said stationary member, arms connecting said rocking lever with the ends of the brake band, and an abutment on said stationary member and one of said links having a finger adapted to normally engage with said abutment to hold said brake shoe in inoperative position.

8. In a wheel brake, the combination with a revoluble member and a stationary annular member, of a brake band, a casing revolubly mounted on said stationary member, said brake band having yieldable connection with said casing, links on said casing, a brake shoe hinged on said links, elements normally locking said casing to said stationary member, means for disengaging said elements from said stationary member, said elements including a rocking lever normally engaging in an aperture provided in said stationary member, arms connecting said rocking lever with the ends of the brake band, and an abutment on said stationary member and one of said links having a finger adapted to normally engage with said abutment to hold said brake shoe in inoperative position, said finger being adapted to disengage from said abutment upon the tilting of said links simultaneously with the disengagement of said locking means.

9. In a wheel brake, the combination with a revoluble member and a stationary annular member, of a brake band, a casing revolubly mounted on said stationary member, said brake band having yieldable connection with said casing, links on said casing, a brake shoe hinged on said links, elements normally locking said casing to said stationary member, means for disengaging said elements from said stationary member, said elements including a rocking lever normally engaging in an aperture provided in said stationary member, arms connecting said rocking lever with the ends of the brake band, and an abutment on said stationary member, one of said links having a finger adapted to normally engage with said abutment to hold said brake shoe in inoperative position, said finger being adapted to disengage from said abutment upon the tilting of said links simultaneously with the disengagment of said locking means, said elements further including a pawl associated with said rocking lever and a ratchet for said pawl in one of said links 10. In a wheel brake, the combination with a revoluble member and a stationary annular member, of a brake band, a casing revolubly mounted on said stationary member, said brake band having yieldable connection with said casing, links on said casing, a brake shoe hinged on said links, elements normally locking said casing to said stationary member, means for disengaging said elements from said stationary member, a ledge on said brake shoe, an intercepting member for said ledge, a shaft upon which said intercepting member is eccentrically mounted, and manually operable means for said shaft.

11. In a wheel brake, the combination with a revoluble member and a stationary annular member, of a brake band, a casing revolubly mounted on said stationary member, said brake band having yieldable connection with said casing, links on said casing, a brake shoe hinged on said links, elements normally locking said casing to said stationary member, means for disengaging said elements from said stationary member, a ledge on said brake shoe, an intercepting member for said ledge, a shaft upon which said intercepting member is eccentrically mounted, manually operable means for said shaft, and a manually operable lever for said disengaging means.

12. In a wheel brake, the combination with a revoluble member and a stationary annular member, of a brake band, a casing revolubly mounted on said stationary member, said brake band having yieldable connection with said casing, links on said casing, a brake shoe hinged on said links, elements normally locking said casing to said stationary member, means for disengaging said elements from said stationary member, a ledge on said brake shoe, an intercepting member for said ledge, a shaft upon which said intercepting member is eccentrically mounted, a manually operable lever for said shaft, and a second manually operable lever for said disengaging means, said first lever being adapted to be actuated by said second lever.

In testimony whereof I affix my signature.

ERNEST C. CLEVELAND. [L. S.]